US009183716B2

(12) United States Patent
Connell, II et al.

(10) Patent No.: US 9,183,716 B2
(45) Date of Patent: Nov. 10, 2015

(54) SYSTEM AND METHOD FOR MANAGING MOVING SURVEILLANCE CAMERAS

(75) Inventors: Jonathan H. Connell, II, Cortlandt-Manor, NY (US); Arun Hampapur, Norwalk, CT (US); Andrew W. Senior, New York, NY (US); Chiao-Fe Shu, Scarsdale, NY (US); Ying-Li Tian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 2208 days.

(21) Appl. No.: 11/688,474

(22) Filed: Mar. 20, 2007

(65) Prior Publication Data

US 2008/0231706 A1 Sep. 25, 2008

(51) Int. Cl.
*H04N 7/18* (2006.01)
*G08B 13/196* (2006.01)

(52) U.S. Cl.
CPC .... *G08B 13/19689* (2013.01); *G08B 13/19606* (2013.01)

(58) Field of Classification Search
CPC .................. G08B 13/19606; G08B 13/19602; G08B 13/19689
USPC .................................................. 348/155, 154
See application file for complete search history.

(56) References Cited

U.S. PATENT DOCUMENTS

| | | | | |
|---|---|---|---|---|
| 4,305,648 | A | 12/1981 | Takahashi et al. | |
| 5,526,045 | A * | 6/1996 | Oshima et al. | 348/208.5 |
| 5,969,755 | A | 10/1999 | Courtney | |
| 6,476,861 | B1 * | 11/2002 | Min | 348/208.15 |
| 7,457,433 | B2 * | 11/2008 | Hampapur et al. | 382/103 |
| 2003/0160867 | A1 * | 8/2003 | Ohto et al. | 348/135 |
| 2004/0165663 | A1 | 8/2004 | Hanami | |
| 2006/0045185 | A1 * | 3/2006 | Kiryati et al. | 375/240.16 |
| 2006/0061653 | A1 | 3/2006 | Hampapur et al. | |
| 2006/0098092 | A1 | 5/2006 | Park | |

OTHER PUBLICATIONS

Brown et al., "IBM Smart Surveillance System (S3): An Open and Extensible Architecture for Smart Video Surveillance," 2005, 4 pages, IBM T.J. Watson Research Center, Hawthorne, NY, pulled from web site: http://research.microsoft.com/iccv2005/demo/IBM_S3/IBMS3_ICCV05Demo.PDF.

* cited by examiner

*Primary Examiner* — Daniel C Murray
*Assistant Examiner* — Adam Cooney
(74) *Attorney, Agent, or Firm* — Maeve McCarthy; Hoffman Warnick LLC

(57) ABSTRACT

An approach that manages moving surveillance cameras is described. In one embodiment, there is a system for managing images generated from a movable camera. In this embodiment, the system comprises a motion estimation component configured to determine camera motion. A camera motion alert component is configured to generate an alert in response to a determination that the camera has moved or the camera has ceased moving.

23 Claims, 4 Drawing Sheets

SYSTEM AND METHOD FOR MANAGING MOVING SURVEILLANCE CAMERAS

BACKGROUND

This disclosure relates generally to video camera systems and more particularly to steerable video surveillance cameras.

Most currently available video surveillance analytics systems rely on background subtraction to detect objects of interest by comparing incoming frames of video with a background model that provides a reference representation of what a video camera should see if no moving objects were present. The background model is created by a background maintenance procedure that learns the normal appearance of each pixel or local area of the field of view of the camera. These types of video surveillance analytics systems work on the assumption that the camera does not move and that any pixel will continue to see the same region of the real world. If this assumption is violated, i.e., the camera is moved, then a pixel will receive light from a different part of the scene from the real world and differences not due to scene changes will be detected. The analytics component of the surveillance system detects these differences through background subtraction, and because the detected differences are not due to scene changes, the system generates many false positives, creating tracks for artifacts that are not due to moving objects. In addition, the system is quite likely to fail to track true moving objects because of the number of false tracks being generated.

Camera motions that can cause false positives to occur in video surveillance analytics systems that use background subtraction can occur for several reasons. For example, wind and vibration can cause the camera to make small movements that result in the camera oscillating around its normal position. Also, steerable surveillance cameras that are controlled by an operator such as a security guard or by an automated procedure that moves the camera can be subject to false positives because of the visual changes caused by the camera motion. Other reasons for camera motion can be the result of direct physical movement of the camera. For example, a maintenance worker could turn the camera, a truck could collide with the camera or an intruder could turn the camera so that it could no longer be used to observe activity in a certain area under surveillance.

Various approaches have been employed to stabilize camera motions that occur for the above-noted reasons. These stabilization approaches can use mechanical, electromechanical or electronic methods to remove the effects of movement from the images delivered to the background subtraction detection component of the video surveillance analytics systems. Mechanical and electromechanical methods may move the lens or sensor of the camera in such a way that the image formed on the sensor maintains the same alignment with it, while electronic methods may detect the offset in the obtained image and shift it back to counteract the detected motion.

These approaches work well in stabilizing small camera motions but are not effective in stabilizing large camera motions that are beyond the range of mechanical actuators' ability to move the lens or sensor to compensate or motions that are so great that compensation mechanisms introduce image distortions of other kinds that are in themselves problematic. In addition, these approaches fail to work well for camera motions that cannot be dealt with by a compensation method that can compensate for movements of the camera such as the twisting of the camera about its optical axis.

SUMMARY

In one embodiment, there is a system for managing images generated from a movable camera. In this embodiment, the system comprises a motion estimation component configured to determine camera motion. A camera motion alert component is configured to generate an alert in response to a determination that the camera has moved or the camera has ceased moving.

In a second embodiment, there is a method for managing images generated from a movable camera. In this embodiment, the method comprises: determining whether the camera has moved; and generating an alert in response to a determination that the camera has moved or ceased moving.

In a third embodiment, there is a computer-readable medium storing computer instructions, which when executed, enables a computer system to manage images generated from a movable camera. In this embodiment, the computer instructions comprise determining whether the camera has moved; and generating an alert in response to a determination that the camera has moved or ceased moving.

In a fourth embodiment, there is a method for deploying a tool for use in a computer system that manages images generated from a movable camera. In this embodiment, a computer infrastructure is provided and is operable to determine whether the camera has moved; and generate an alert in response to a determination that the camera has moved or ceased moving.

Therefore, this disclosure provides a system, method, and computer-readable medium for managing images generated from a movable camera.

DETAILED DESCRIPTION

Embodiments of this disclosure are directed to a technique for managing images generated from a movable camera such as a camera used in a video surveillance analytics system. Although the description that follows pertains to a camera used in a video surveillance analytics system, the principles of this disclosure are suitable for use in any application where movable cameras are employed. The embodiments of this disclosure provide stabilization or motion compensation to images generated from the camera in instances in which the camera has experienced small motions and also has the capability to distinguish large camera motions from small motions and thus suspend operation of the camera upon detecting these large motions.

Figure 1:
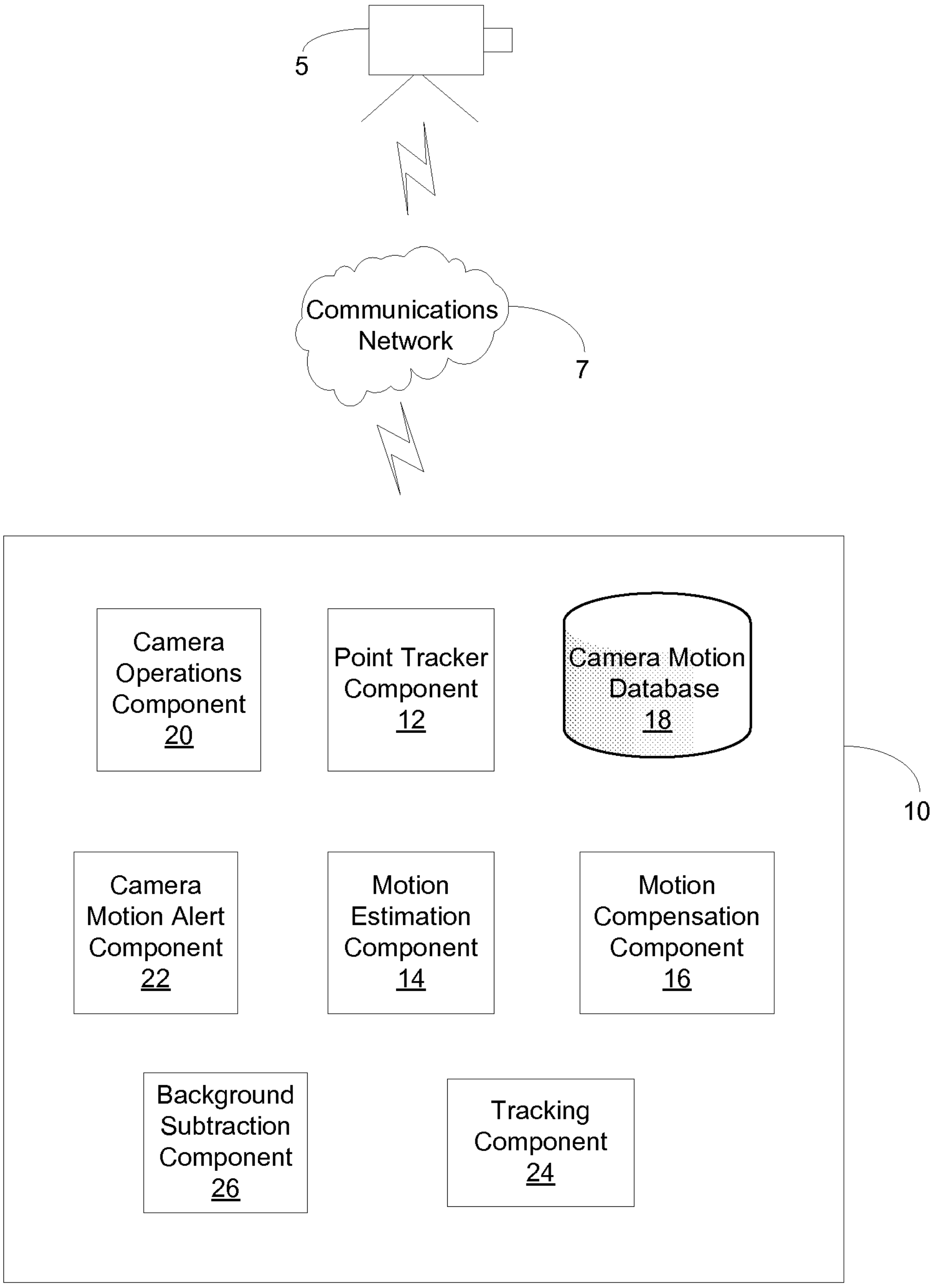
FIG. 1 shows a schematic diagram of a system for managing images generated from a movable camera according to one embodiment of this disclosure.

FIG. 1 shows a schematic diagram of a system 10 for managing images generated from a movable camera 5 according to one embodiment of this disclosure. Although not shown in FIG. 1, in one embodiment the system 10 resides in a video surveillance analytics system. In other embodiments, the system 10 might reside within a camera or within a system for broadcast television production.

Although not expressly shown in FIG. 1, all of the components embodied in system 10 are configured to interact with each other. As shown in FIG. 1, the system 10 comprises in one embodiment a point tracker component 12 configured to generate point motion estimates from image frames received from the camera. The point tracker component 12 receives image frames from the camera 5 directly or through a communication network 7 that can comprise a wired or wireless connection. The point tracker component 12 generates point motion estimates from the image frames by searching for points in subsequent images that correspond to points found in an earlier image. In one embodiment, a well known method such as the Lucas and Kanade algorithm is used to generate point motion estimates. Those skilled in the art will recognize that other well known methods can be used to generate point motion estimates.

A motion estimation component 14 uses the point motion estimates generated by the point tracker component 12 to determine whether the camera 5 has moved. In particular, the motion estimation component 14 determines camera movement from the point motion estimates by using a technique such as estimating a best-fit motion that matches all the points after discarding outliers. In one embodiment, a well known method such as the RANSAC algorithm iterated on least-squares affine motion estimates is used. Those skilled in the art will recognize that other well known methods can be used to determine whether the camera has moved.

The motion estimation component 14 is configured to distinguish between small camera motions and large camera motions. As used herein, small camera motions are those motions which are generated by vibrations and wind movement, and for which the field of view of the camera still largely overlaps with the original view of the camera and thus still can generate acceptable images after motion compensation. On the other hand, large camera motions are due to a change in the position of the camera that results in the field of view changing significantly.

In one embodiment, the motion estimation component 14 distinguishes between small camera motions and large camera motions by comparing the point motion estimates against a predetermined threshold. The predetermined threshold will depend on the surveillance application and in particular how broadly the operator wants to define small and large camera motions. In an illustrative embodiment, if the point motion estimates are below the predetermined threshold, then the camera is deemed to have experienced a small camera motion, while estimates that are above the threshold are considered to be indicative of a large camera motion. As those skilled in the art will recognize, other comparison methodologies are suitable for use in determining whether the camera has experienced small camera motions or large camera motions. For example, in one embodiment, a large camera motion can be deemed to have occurred if the point motion estimates are below the predetermined threshold, while a small camera motion would be deemed to occur in instances where the estimates are above the threshold.

A motion compensation component 16 provides compensation to the image frames in response to a determination that the camera 5 has moved in small camera motions. In particular, the motion compensation component 16 provides compensation to the image frames by transforming the image frames (e.g., by an affine warp or translation) such that they match closely to the image frames from the unmoved camera.

FIG. 1 shows that the system 10 further comprises a camera motion database 18 that stores camera motion related information. In one embodiment, the camera motion related information comprises information such as amounts and directions of recorded camera motions (e.g., pan, tilt, zoom and translational motion) and positions of instances in which camera motions began and ceased. Those skilled in the art will recognize that the camera motion database 18 can store other camera motion related information such as rotation about the optical axis, motions in terms of angles or pixels, relative or absolute motions, etc.

A camera operations component 20 is configured to control operations of the camera 5. In particular, the camera operations component 20 will suspend operations if the motion estimation component 14 determines that the camera 5 has experienced large camera motions and also resume camera operations when the motions estimation component 14 determines that these large camera motions have ceased.

The system 10 as shown in FIG. 1 further comprises a camera motion alert component 22 that is configured to generate alerts to the operator of the surveillance camera system. In particular, the camera motion alert component 22 generates an alert if the motion estimation component 14 determines that the camera 5 has experienced large camera motions. The camera motion alert component 22 will also generates an alert when the camera operations component 20 takes action to suspend operation of the camera 5 due to the large camera motions. In addition, the camera motion alert component 22 will generate an alert when the motion estimation component 14 determines that these large camera motions have ceased. As those skilled in the art will appreciate, the alerts can take several different forms such as a textual message, an audio message, an alert sound, indicator light, (cell) phone call, short messaging service (SMS), page, etc.

FIG. 1 shows that the system 10 also comprises a tracking component 24 configured to track objects of interest that appear in the field of view of the camera. The tracking component 24 utilizes well known tracking algorithms such as the Lucas-Kanade algorithm to track points within a specified field of view.

The system 10 of FIG. 1 also comprises a background subtraction component 26 that is configured to detect objects of interest that appear in the field of view of the camera 5. As explained above, the background subtraction component 26 uses a background model to compare against incoming frames of video generated from the camera 5 to detect objects.

Figure 2:
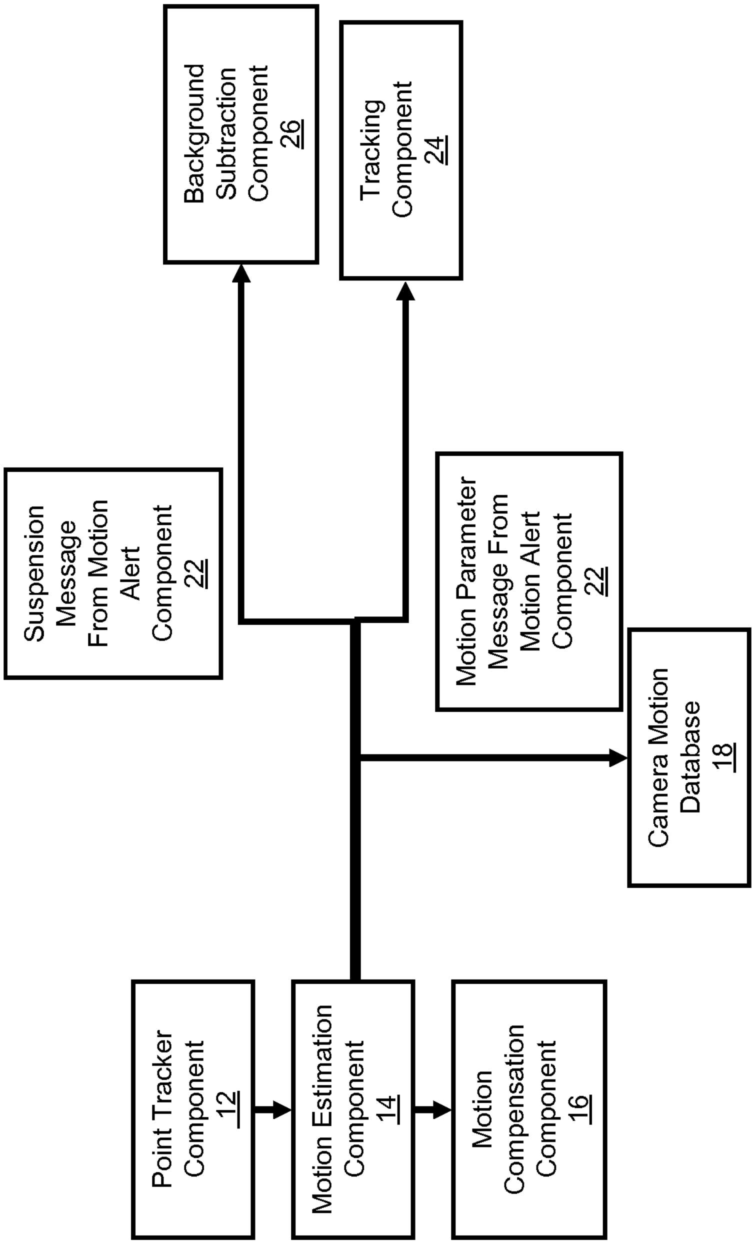
FIG. 2 shows a flow diagram showing the interactions between some of the components shown in FIG. 1.

FIG. 2 shows a flow diagram showing the interactions between some of the components shown in FIG. 1. Details of these interactions are shown in FIG. 3.

Figure 3:
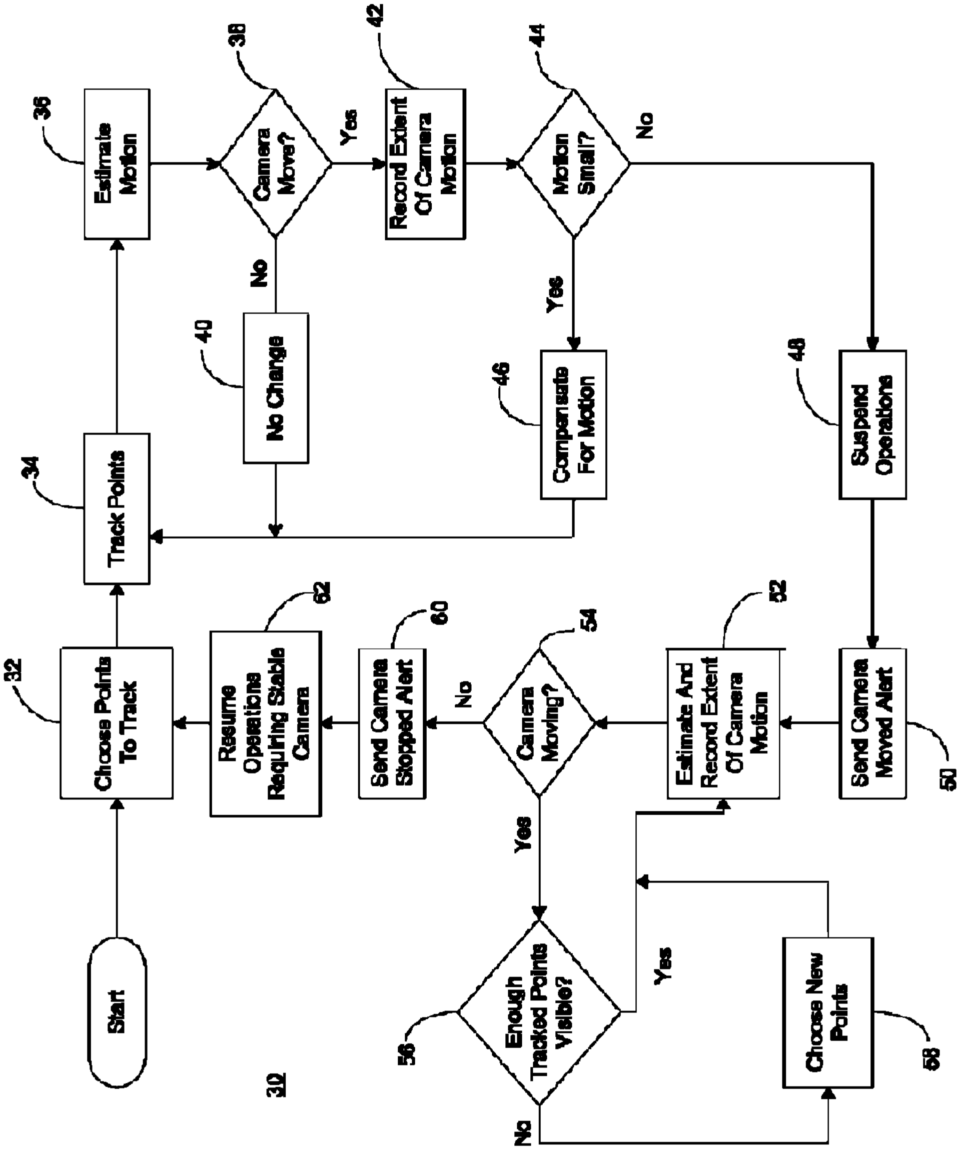
FIG. 3 shows a flow chart describing the operation of the system shown in FIG. 1 according to one embodiment of this disclosure.

FIG. 3 shows a flow chart 30 describing the operation of the system 10 shown in FIG. 1 according to one embodiment of this disclosure. The operation of the system 10 begins at 32 where the point tracker component 12 chooses points to track. In one embodiment, the point tracker component 12 can use a corner finding algorithm to choose points to track. Tracking these points proceeds at 34. The motion estimation component 14 uses the well known Lucas-Kanade algorithm in each frame received from the camera 5 to determine whether the camera has moved at 36. In particular, the motion estimation component 14 uses the point motion estimates generated by the point tracker component 12 to estimate the overall camera motion.

If the camera 5 has not moved as determined at decision block 38 and noted at 40, then the system 10 continues with the next frame where points are tracked at 34 and estimates are generated again at 36. These acts as embodied in blocks 34-40 will continue in a loop fashion until it is determined at decision block 38 that the camera 5 has moved. If a movement occurs, then the extent of movement (e.g., size and direction of the movement) is recorded in the camera motion database 18 at 42 and made available for future searches. In particular, the recorded camera motion can be used as a search criterion for later database searches using parametric or geometric searches. Examples of possible searches could include determining when the camera moved; was the camera moved greater than 30 degrees/second; when did the camera point at that door.

At decision block 44, the motion estimation component 14 determines whether the camera motion is small or large. As mentioned above, the motion estimation component 14 distinguishes between small camera motions and large camera motions by comparing the point motion estimates against a predetermined threshold. In a preferred embodiment, if the point motion estimates are below the predetermined threshold, then the camera is deemed to have experienced a small camera motion and as result the motion compensation component 16 will provide compensation to the image frames at 46 by performing shifting or warping operations. In this instance, after the motion compensation component 16 has provided compensation, then the system 10 continues with the next frame where points are tracked at 34 and acts 36-44 are repeated until a large camera motion is indicated at 44.

If the point motion estimates are above the predetermined threshold, then the camera is deemed to have experienced a large camera motion and as result the camera operations component 20 will suspend operations at 48. In particular, the camera operations component 20 will suspend operations that depend on a stable image such as background subtraction and tracking operations. Generally, the suspension of operations may involve performing other processing operations such as storing system state variables (e.g., the position of the camera, information regarding the background model, currently tracked objects, etc.) and terminating current tracks in the tracking component 24, or discarding recent updates as unreliable.

In one embodiment, the camera motion alert component 22 will generate an alert at 50 indicating that the camera 5 has experienced large camera motions. In this case, the camera motion alert may be stored in the camera motion database 18 or delivered to an operator of the surveillance system to warn that the camera has moved. For example, the camera motion alert component 22 could send a real-time alert to a security guard in the event that the camera motion is triggered by an external agency such as an intruder turning the camera so that it cannot observe activity in a certain area.

While the camera is moving, the motion estimation component 14 will estimate camera movement parameters (e.g., pan and tilt measurements) from the point motion estimates using a technique such as for example, least squares or RANSAC at 52 and also record these parameters in the camera motion database 18 for later searches. In addition, the motion estimation component 14 determines whether the camera is still moving at 54. If the motion estimation component 14 determines that the camera is still moving, then it is determined at decision block 56 whether there are enough visible tracked points (i.e., whether the points that the system is attempting to track are still within the field of view the camera and are not occluded by moving objects).

If there are not enough visible tracked points, then additional points are chosen at 58 by running an algorithm such as a corner-finding algorithm. If there are enough visible tracked points as determined at 56 or as chosen at 58, then the motion estimation component 14 will estimate movement parameters again at 52. Process acts 52-58 will continue to cycle in a loop until it is determined at decision block 54 that the camera 5 is no longer moving.

When no motion is detected, the camera motion alert component 22 will generate an alert at 60 that large camera motions have ceased. In addition, the camera motion alert may be stored in the camera motion database 18 and made available for future use by searching the database. Furthermore, the camera operations component 20 will resume camera operations that require a stable camera at 62. In particular, the camera operations component 20 will resume operations such as background subtraction and tracking operations as well as resuming detection of small and large camera motions.

Resumption of background subtraction operation may involve the acquisition of a new background model, or it may involve the detection of the camera position with respect to an existing background model or models and the initialization of a new model based on old models (e.g., with image warping and parameter merging). The tracking operation may be initialized with a clean slate, but may also reload parameters for the detected scene, or even resume tracking of moving objects that were being tracked before the camera moved; particularly if the camera motion was of short duration and small net motion.

The foregoing flow chart shows some of the processing functions associated with managing images generated from a movable camera. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

Figure 4:
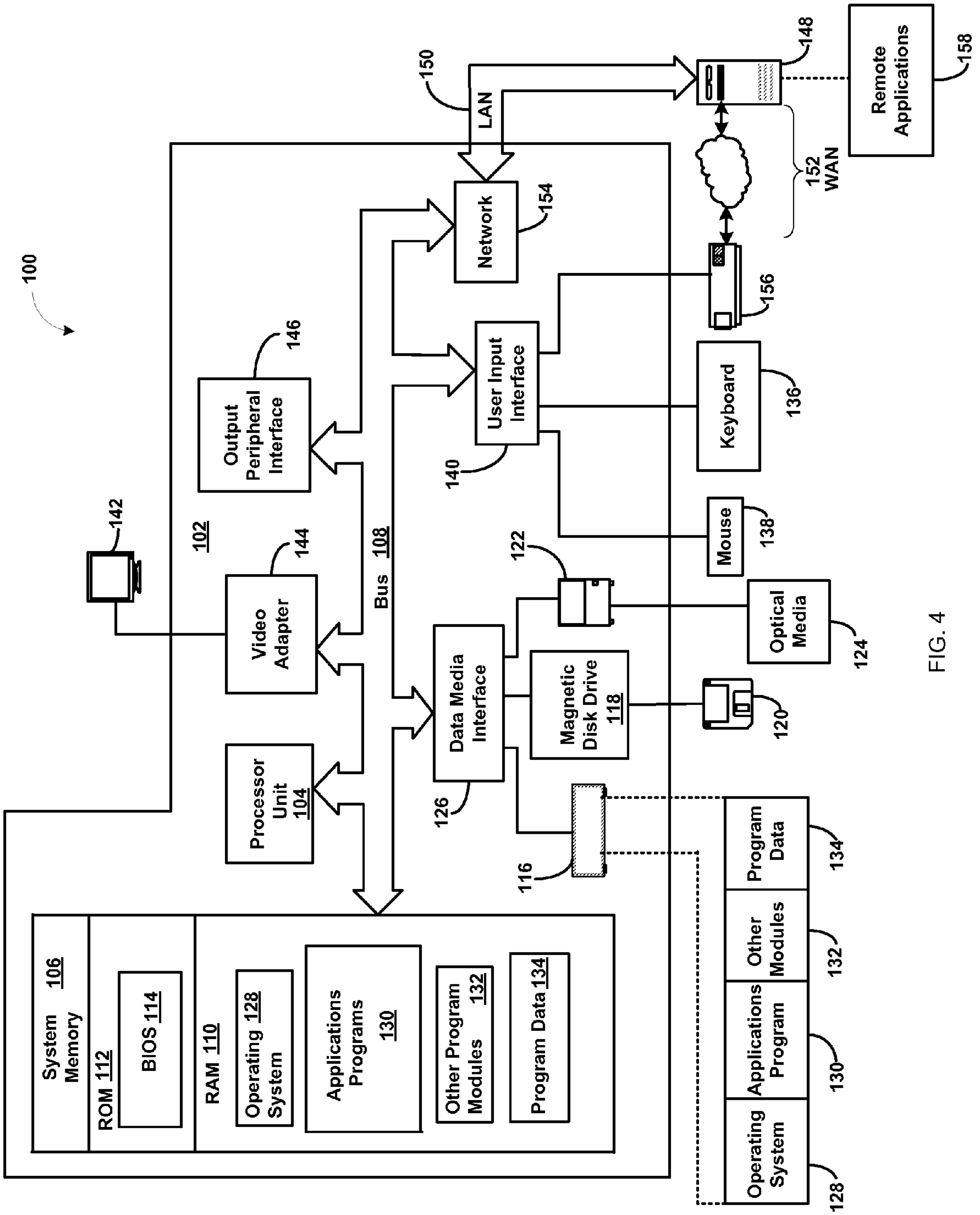
FIG. 4 shows a schematic of an illustrative computing environment in which the system shown in FIG. 1 may operate.

FIG. 4 shows a schematic of an illustrative computing environment in which elements of the system 10 shown in FIG. 1 may operate. The illustrative computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 4.

In the computing environment 100 there is a computer 102 which is operational with numerous other general purpose or special purpose computing system environments or configurations. Examples of well known computing systems, environments, and/or configurations that may be suitable for use with an illustrative computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The illustrative computer 102 may be described in the general context of computer-executable instructions, such as program modules, being executed by a computer. Generally, program modules include routines, programs, objects, components, logic, data structures, and so on, that performs particular tasks or implements particular abstract data types. The illustrative computer 102 may be practiced in distributed computing environments where tasks are performed by remote processing devices that are linked through a communications network. In a distributed computing environment, program modules may be located in both local and remote computer storage media including memory storage devices.

As shown in FIG. 4, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 4, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 4 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130 other program modules 132, and program data 134 or some combination thereof, may include an implementation of the system 10 of FIG. 1 including the point tracker component 12, motion estimation component 14, motion compensation component 16, camera motion database 18, camera operations component 20, camera motion alert component 22, tracking component 24 and background subtraction component 26.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Computer 102 may operate in a networked environment using logical connections to one or more remote computers, such as a remote server/computer 148. Remote computer 148 may include many or all of the elements and features described herein relative to computer 102.

Logical connections shown in FIG. 4 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 4 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this disclosure a system and method for managing moving surveillance cameras. While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

For example, in another embodiment, there is a business method that performs the functionalities of the disclosure on a subscription, advertising, and/or fee basis. That is, a service provider could manage images generated from a movable camera. In this case, the service provider can create, deploy, maintain, support, etc., a system, such as system 10 (FIG. 1) that performs the processes described in the disclosure for one or more sellers of goods and/or services. In return, the service provider can receive payment from the seller(s) under a subscription and/or fee agreement and/or the service provider can receive payment from the sale of advertising content to one or more third parties.

In still another embodiment, this disclosure provides a method for using the system 10 within a computer system to manage images generated from a movable camera. In this case, a system, such as system 10 (FIG. 1), can be provided and one or more systems for performing the processes described in the disclosure can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the disclosure.

What is claimed is:

1. A computer system, comprising:

at least one processing unit;

memory operably associated with the at least one processing unit;

a system for managing images generated from a movable camera that is storable in memory and executable by the at least one processing unit, the system for managing images comprising:

a background subtraction component configured to detect objects of interest that appear in a field of view of the camera, the background subtraction component including a background model to compare against incoming image frames of video generated from the camera to detect objects;

a point tracker component configured to generate point motion estimates from the image frames received from the camera while the background subtraction component performs a background subtraction operation, wherein the point motion estimates are based on points obtained from the image frames that correspond with points present in previous image frames;

a motion estimation component configured to determine camera motion based on the point motion estimates generated from the point tracker component, wherein the motion estimation component uses the point motion estimates to distinguish small camera motions from large camera motions in response to determining camera motion, wherein small camera motions are characterized by having a field of view of the camera largely overlap with an original field of view of the camera and large camera motions are characterized by having the field of view of the camera different from the original field of view of the camera, the motion estimation component comparing the point motion estimates to a predetermined threshold to distinguish small camera motions from large camera motions, the motion estimation component indicating small camera motions in response to determining that the point motion estimates are below the predetermined threshold and indicating large camera motions in response to determining that the point motion estimates are above the predetermined threshold, the motion estimation component further configured to estimate camera movement parameters in response to indicating large camera motions;

a motion compensation component configured to provide compensation to the image frames in response to a determination that the camera has moved in small camera motions, the compensation including transforming the image frames to match with image frames generated from the camera while in an unmoved position;

a camera operations component configured to control operations of the camera, wherein the camera operations component is configured to suspend movement of the camera, the background subtraction operation performed by the background subtraction component, the generation of point motion estimates by the point tracker component, and the camera motion estimates determined by the motion estimation component in response to a determination of large camera motions, wherein the motion estimation component is configured to estimate and record an extent of the large camera motions in response to the camera operations component suspending the movement of the camera, the background subtraction operation, the generation of point motion estimates, and the camera motion estimates, and wherein the camera operations component is configured to resume movement of the camera, the background subtraction operation, the point tracking and the camera motion estimates in response to a determination that the large camera motions have ceased, the resuming of the background subtraction operation including at least one of acquiring a new background model, detecting a camera position with respect to the existing background model, and initializing a new background model based on older background models; and a camera motion alert component configured to generate an alert in response to a determination that the camera has moved or the camera has ceased moving.

2. The computer system according to claim 1, further comprising a camera motion database configure to store camera motion related information.

3. The computer system according to claim 2, wherein the camera motion related information comprises amounts and directions of recorded camera motions and positions of instances in which camera motions began and ceased.

4. The computer system according to claim 1, wherein the alert generated from the camera motion alert component comprises messages alerting of large camera motions.

5. The computer system according to claim 2, further comprising a tracking component configured to track objects of interest that appear in the field of view of the camera.

6. The computer system according to claim 5, wherein the tracking component is configured to use the camera motion related information from the camera motion database to track objects of interest that appear in the field of view of the camera while the background subtraction component performs the background subtraction operation, the point tracker component generates point motion estimates, the motion estimation component determines camera motion and the motion compensation component provides compensation, wherein the tracking is suspended in response to a determination of camera motion.

7. The computer system according to claim 6, wherein the tracking component is configured to determine locations where tracking is suspended.

8. A method for managing images generated from a movable camera, comprising:

performing a background subtraction operation to detect objects of interest that appear in a field of view of the camera, the background subtraction operation using a background model to compare against incoming image frames of video generated from the camera to detect objects;

tracking the objects of interest that appear in the field of view of the camera;

generating point motion estimates from the image frames received from the camera while tracking the objects and performing the background subtraction operation, wherein the point motion estimates are based on points obtained from the image frames that correspond with points present in previous image frames;

determining whether the camera has moved based on the point motion estimates;

in response to determining camera motion, using the point motion estimates to distinguish small camera motions from large camera motions, wherein small camera motions are characterized by having a field of view of the camera largely overlap with an original field of view of the camera and large camera motions are characterized by having the field of view of the camera different from the original field of view of the camera, the distinguishing of small camera motions from large camera motions including comparing the point motion estimates to a predetermined threshold, wherein small camera motions are indicated in response to determining that the point motion estimates are below the predetermined threshold and large camera motions are indicated in response to determining that the point motion estimates are above the predetermined threshold;

estimating camera movement parameters in response to indicating large camera motions;

providing motion compensation to the image frames in response to a determination that the camera has moved in small camera motions, the motion compensation including transforming the image frames to match with image frames generated from the camera while in an unmoved position;

suspending movement of the camera, the background subtraction operation, the tracking, and the generation of the camera motion estimates in response to a determination of large camera motions;

estimating and recording an extent of the large camera motions in response to suspending the movement of the camera, the background subtraction operation, the tracking, and the generation of point motion estimates;

resuming movement of the camera, the background subtraction operation, the tracking and the generation of the camera motion estimates in response to a determination that the large camera motions have ceased, the resuming of the background subtraction operation including at least one of acquiring a new background model, detecting a camera position with respect to the existing background model, and initializing a new background model based on older background models; and generating an alert in response to a determination that the camera has moved or ceased moving.

9. The method according to claim 8, further comprising storing camera motion related information.

10. The method according to claim 9, wherein the camera motion related information comprises amounts and directions of recorded camera motions and positions of instances in which camera motions began and ceased.

11. The method according to claim 8, wherein the generating of an alert comprises providing messages alerting of large camera motions.

12. The method according to claim 9, wherein the tracking comprises using the camera motion related information to track the objects of interest that appear in the field of view of the camera.

13. The method according to claim 12, wherein the tracking comprises determining locations where tracking is suspended.

14. A computer-readable storage device storing computer instructions, which when executed, enables a computer system to manage images generated from a movable camera, the computer instructions comprising:

performing a background subtraction operation to detect objects of interest that appear in a field of view of the camera, the background subtraction operation using a background model to compare against incoming image frames of video generated from the camera to detect objects;

tracking the objects of interest that appear in the field of view of the camera;

generating point motion estimates from the image frames received from the camera while tracking the objects and performing the background subtraction operation, wherein the point motion estimates are based on points obtained from the image frames that correspond with points present in previous image frames;

determining whether the camera has moved based on the point motion estimates;

in response to determining camera motion, using the point motion estimates to distinguish small camera motions from large camera motions, wherein small camera motions are characterized by having a field of view of the camera largely overlap with an original field of view of the camera and large camera motions are characterized by having the field of view of the camera different from the original field of view of the camera, the distinguishing of small camera motions from large camera motions including comparing the point motion estimates to a predetermined threshold, wherein small camera motions are indicated in response to determining that the point motion estimates are below the predetermined threshold and large camera motions are indicated in response to determining that the point motion estimates are above the predetermined threshold;

estimating camera movement parameters in response to indicating large camera motions;

providing motion compensation to the image frames in response to a determination that the camera has moved in small camera motions, the motion compensation including transforming the image frames to match with image frames generated from the camera while in an unmoved position;

suspending movement of the camera, the background subtraction operation, the tracking, and the generation of the camera motion estimates in response to a determination of large camera motions;

estimating and recording an extent of the large camera motions in response to suspending the movement of the camera, the background subtraction operation, the tracking, and the generation of point motion estimates;

resuming movement of the camera, the background subtraction operation, the tracking and the generation of the camera motion estimates in response to a determination that the large camera motions have ceased, the resuming of the background subtraction operation including at least one of acquiring a new background model, detecting a camera position with respect to the existing background model, and initializing a new background model based on older background models; and generating an alert in response to a determination that the camera has moved or ceased moving.

15. The computer-readable storage device according to claim 14, further comprising instructions for storing camera motion related information.

16. The computer-readable storage device according to claim 15, wherein the camera motion related information comprises amounts and directions of recorded camera motions and positions of instances in which camera motions began and ceased.

17. The computer-readable storage device according to claim 14, wherein the generating of an alert comprises instructions for providing messages alerting of large camera motions.

18. The computer-readable storage device according to claim 15, wherein the tracking of objects of interest comprises instructions for using the camera motion related information to track objects of interest that appear in the field of view of the camera.

19. A method for deploying a tool for use in a computer system that manages images generated from a movable camera, comprising:

providing a computer infrastructure operable to:

perform a background subtraction operation to detect objects of interest that appear in a field of view of the camera, the background subtraction operation using a background model to compare against incoming image frames of video generated from the camera to detect objects;

track the objects of interest that appear in the field of view of the camera;

generate point motion estimates from the image frames received from the camera while tracking the objects and performing the background subtraction operation, wherein the point motion estimates are based on points obtained from the image frames that correspond with points present in previous image frames;

determine whether the camera has moved based on the point motion estimates;

in response to determining camera motion, use the point motion estimates to distinguish small camera motions from large camera motions, wherein small camera motions are characterized by having a field of view of the camera largely overlap with an original field of view of the camera and large camera motions are characterized by having the field of view of the camera different from the original field of view of the camera, the distinguishing of small camera motions from large camera motions including comparing the point motion estimates to a predetermined threshold, wherein small camera motions are indicated in response to determining that the point motion estimates are below the predetermined threshold and large camera motions are indicated in response to determining that the point motion estimates are above the predetermined threshold;

estimate camera movement parameters in response to indicating large camera motions;

provide motion compensation to the image frames in response to a determination that the camera has moved in small camera motions, the motion compensation including transforming the image frames to match with image frames generated from the camera while in an unmoved position;

suspend movement of the camera, the background subtraction operation, the tracking, and the generation of the camera motion estimates in response to a determination of large camera motions;

estimate and record an extent of the large camera motions in response to suspending the movement of the camera, the background subtraction operation, the tracking, and the generation of point motion estimates;

resume movement of the camera, the background subtraction operation, the tracking and the generation of the camera motion estimates in response to a determination that the large camera motions have ceased, the resuming of the background subtraction operation including at least one of acquiring a new background model, detecting a camera position with respect to the existing background model, and initializing a new background model based on older background models; and generate an alert in response to a determination that the camera has moved or ceased moving.

20. The computer system according to claim 1, wherein the resuming of the point tracking includes one of initializing the point tracking to start from a clean slate, reloading camera parameters from the image frames that resulted in the suspended operations, and resuming point tracking of moving objects from a time the point tracking was suspended.

21. The method according to claim 8, wherein the resuming of the tracking includes one of initializing the tracking to start from a clean slate, reloading camera parameters from the image frames that resulted in the suspended operations, and resuming tracking of moving objects from a time the tracking was suspended.

22. The computer-readable storage device according to claim 14, wherein the resuming of the tracking includes one of initializing the tracking to start from a clean slate, reloading camera parameters from the image frames that resulted in the suspended operations, and resuming tracking of moving objects from a time the tracking was suspended.

23. The method according to claim 19, wherein the resuming of the tracking includes one of initializing the tracking to start from a clean slate, reloading camera parameters from the image frames that resulted in the suspended operations, and resuming tracking of moving objects from a time the tracking was suspended.

* * * * *